No. 885,045. PATENTED APR. 21, 1908.
J. H. HAUGHAWOUT.
INCUBATOR.
APPLICATION FILED AUG. 31, 1907.
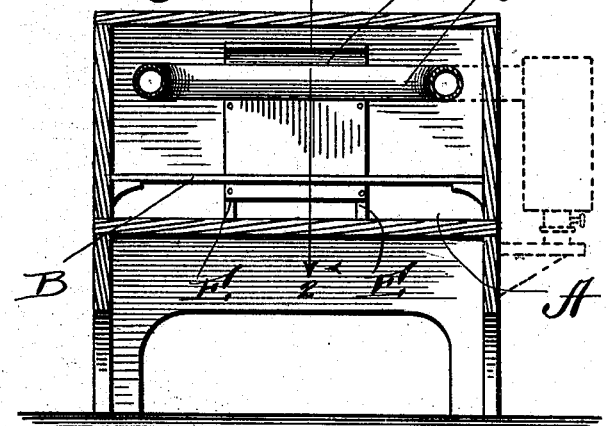
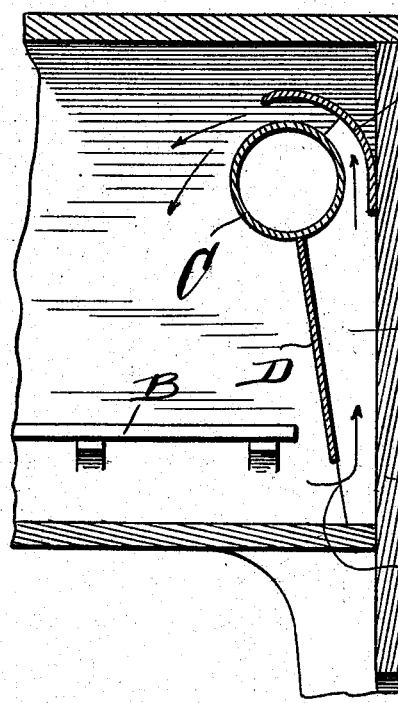
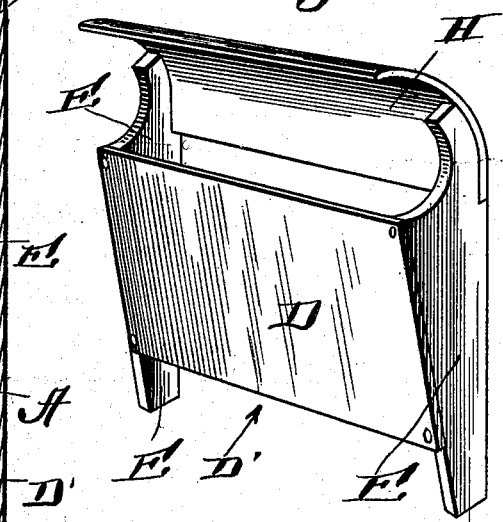
WITNESSES:
INVENTOR
J. H. Haughawout
BY Franklin N. Hough
Attorney

UNITED STATES PATENT OFFICE.

JOSEPH H. HAUGHAWOUT, OF FAIRMONT, NEBRASKA.

INCUBATOR.

No. 885,045.

Specification of Letters Patent.

Patented April 21, 1908.

Application filed August 31, 1907. Serial No. 390,931.

*To all whom it may concern:*

Be it known that I, JOSEPH H. HAUGHAWOUT, a citizen of the United States, residing at Fairmont, in the county of Fillmore and State of Nebraska, have invented certain new and useful Improvements in Incubators; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in incubators and especially in the provision of heat deflecting mechanism, so arranged with reference to the heating pipes of the incubator as to cause a circulation within the casing of the incubator.

The invention consists further in the provision of a detachable deflecting means designed to be applied to various forms of incubators, in which the hot water or hot air pipes for heating the interior of the incubator are positioned adjacent to the side walls of the casing thereof.

The invention comprises various details of construction and combinations and arrangements of parts which will be hereinafter fully described and then specifically defined in the appended claims.

The invention is illustrated in the accompanying drawings, in which:—

Figure 1 is a vertical sectional view through an incubator, showing the application of my invention. Fig. 2 is a sectional view on line 2—2 of Fig. 1. Fig. 3 is a detailed perspective view of the heat deflecting apparatus.

Reference now being had to the details of the drawings by letter, A designates the casing of an incubator which may be of any of the well known forms and is provided with an egg tray B and a heating pipe C, whereby the interior of the incubator may be heated by hot air or water as may be desired. Said pipe C is positioned, it will be observed, adjacent to one of the side walls of the casing, and D designates an inclined heat deflecting plate, the upper end of which is positioned preferably in contact with the lower portion of the pipe C and the lower edge thereof spaced apart from the bottom of the casing in order to allow the air in circulation to pass in the direction shown by arrows in Fig. 2 of the drawings. Said plate D is fastened at its ends to the plate E, the lower ends of which rest upon the bottom of the casing. Fixed to the rear edges of the plates E is a curved heat deflecting plate H, the upper end of which projects forward and overhangs the upper ends of the plate E and, when positioned in place within the incubator, is positioned as shown in Fig. 2 of the drawings, forming a constricted passageway intermediate the same and the circumference of the pipe C, whereby the air in said passageway may become heated by radiation from the pipe and thus cause a circulation within the incubator casing.

In operation, the heat deflecting apparatus being positioned within an incubator in the manner shown, heat passed through the pipe C will cause the air in the passage-way to enter the space between the plate and pipe C, and will become heated by radiation and move in the direction indicated by the arrows. As the plate D will shut off the passage of air behind the plate D from a location adjacent to the lower portion of the pipe, the air must needs enter the space between the plate D and the adjacent wall of the incubator through the space D' beneath the lower end of said plate D, as indicated by arrows in Fig. 2 of the drawings, and passing up through the passageway to replace the heated air which takes the course indicated by the arrow. It will be noted that, by the provision of the apparatus shown and described, the interior of the heating chamber will be uniformly heated, the circuit being about the pipe and from beneath the egg tray.

It is my purpose to so construct my heating apparatus that it may be readily applied to various forms of incubators in which the heating pipes may be positioned at locations adjacent to the side walls of the incubator.

What I claim to be new is:—

1. A heat deflecting apparatus for incubators comprising a casing with side and end walls, a heating pipe positioned adjacent to the side wall of the casing, a deflecting plate positioned with its upper end against the lower portion of said pipe and terminating a short distance above the bottom of the incubator, laterally projecting walls at the ends of said plate and adapted to be positioned against the inner surface of the side wall of said casing, as set forth.

2. A heat deflecting apparatus for incubators comprising a casing with side and end walls, a heating pipe positioned adjacent to one of the side walls of the casing, an upright heat deflecting plate in contact with the under portion of said pipe and terminating a slight distance above the bottom of the incubator, end walls projecting from said plate and adapted to be positioned against the side wall of the casing, forming a flue intermediate said plate and wall of the incubator, a curved deflecting plate fastened to said end walls and overhanging said pipe and spaced apart therefrom, as set forth.

3. A heat deflecting apparatus for incubators comprising a casing with side and end walls, a heating pipe positioned adjacent to one of the side walls of the casing, an upright heat deflecting plate in contact with the under portion of said pipe and terminating a slight distance above the bottom of the incubator, end walls projecting from said plate and adapted to be positioned against the side wall of the casing, forming a flue intermediate said plate and wall of the casing, the outer edges of said end walls having shoulders formed therein, the inner edges of said end walls, above the shoulders, being convexed, a heat deflecting plate resting upon said shoulders and overhanging said pipe and spaced apart therefrom, as set forth.

In testimony whereof I hereunto affix my signature in the presence of two witnesses.

JOSEPH H. HAUGHAWOUT.

Witnesses:
 ALLEN H. COX,
 EDWARD U. RAMSAY.